United States Patent
Chen et al.

(10) Patent No.: US 11,635,794 B2
(45) Date of Patent: Apr. 25, 2023

(54) MEMORY SUB-SYSTEM TEMPERATURE THROTTLING RELAXATION

(71) Applicant: Micron Technology, Inc., Boise, ID (US)

(72) Inventors: Mikai Chen, Sunnyvale, CA (US); Zhenming Zhou, San Jose, CA (US); Zhenlei Shen, Milpitas, CA (US); Murong Lang, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 311 days.

(21) Appl. No.: 16/988,854

(22) Filed: Aug. 10, 2020

(65) Prior Publication Data

US 2022/0043493 A1 Feb. 10, 2022

(51) Int. Cl.
*G05D 23/00* (2006.01)
*G06F 1/20* (2006.01)
*G06F 11/30* (2006.01)

(52) U.S. Cl.
CPC .......... *G06F 1/206* (2013.01); *G06F 11/3037* (2013.01); *G06F 11/3058* (2013.01)

(58) Field of Classification Search
CPC .. G06F 1/206; G06F 11/3037; G06F 11/3058; Y02D 10/00
See application file for complete search history.

(56) References Cited

U.S. PATENT DOCUMENTS

| | | | |
|---|---|---|---|
| 8,304,698 B1 | 11/2012 | Tischler | |
| 9,760,311 B1 | 9/2017 | Amir et al. | |
| 10,878,844 B1* | 12/2020 | Tsai | G11B 20/18 |
| 10,971,215 B1* | 4/2021 | Yang | G11C 29/44 |
| 2005/0071701 A1 | 3/2005 | Luick | |
| 2009/0204852 A1* | 8/2009 | Diggs | G06F 11/008 |
| | | | 714/42 |
| 2011/0122691 A1 | 5/2011 | Sprouse | |
| 2017/0345510 A1* | 11/2017 | Achtenberg | G06F 11/1048 |
| 2018/0046231 A1* | 2/2018 | Raghu | G06F 3/0653 |
| 2019/0278510 A1* | 9/2019 | Kaynak | G06F 3/0659 |
| 2021/0141539 A1* | 5/2021 | Vaysman | G06F 3/0658 |

* cited by examiner

*Primary Examiner* — Zhipeng Wang
(74) *Attorney, Agent, or Firm* — Brooks, Cameron & Huebsch, PLLC (57) ABSTRACT

A method includes monitoring temperature characteristics for a plurality of memory components of a memory subsystem and determining that a temperature characteristic corresponding to at least one of the memory components has reached a threshold temperature. The method further includes determining a data reliability parameter for the at least one of the memory components that has reached the threshold temperature, determining whether the determined data reliability parameter is below a threshold data reliability parameter value for the at least one of the memory components that has reached the threshold temperature, and, based on determining that the data reliability parameter for the at least one of the memory components that has reached the threshold temperature is below the threshold data reliability parameter value, refraining from performing a thermal throttling operation.

20 Claims, 4 Drawing Sheets

MEMORY SUB-SYSTEM TEMPERATURE THROTTLING RELAXATION

TECHNICAL FIELD

Embodiments of the disclosure relate generally to memory sub-systems, and more specifically, relate to memory sub-system temperature throttling relaxation.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to memory sub-system temperature throttling relaxation, in particular to memory sub-systems that include a memory sub-system temperature throttling relaxation component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of a non-volatile memory device is a three-dimensional cross-point memory device that includes a cross-point array of non-volatile memory cells. Other examples of non-volatile memory devices are described below in conjunction with FIG. 1. A non-volatile memory device, such as a three-dimensional cross-point memory device, can be a package of one or more memory components (e.g., memory dice). Each die can consist of one or more planes. Planes can be grouped into logic units. For example, a non-volatile memory device can be assembled from multiple memory dice, which can each form a constituent portion of the memory device.

During operation a memory sub-system can experience fluctuations in thermal characteristics, such as operating temperature. For example, because electrical current is utilized to provide power to the memory sub-system, the memory sub-system can exhibit temperature fluctuations during operation. Such fluctuations can become more pronounced based on the type of workload the memory sub-system is subject to. For example, some types of workloads that can be characterized by high volumes of operations can give rise to greater temperature fluctuations within the memory sub-system than workloads that are characterized by low volumes of operations. Further, a memory sub-system can experience temperature fluctuations based on the environment in which the memory sub-system is deployed.

Although some amount of temperature fluctuation is tolerable within a memory sub-system, the memory sub-system can be adversely affected if such temperature fluctuations exceed certain thresholds. For example, if a memory sub-system is exposed to temperatures that are greater than a threshold safe operating temperature range, the memory sub-system can experience degraded performance and, in some instances, can fail.

Some approaches attempt to mitigate the adverse effects of temperature fluctuations on a memory sub-system by performing thermal throttling operations. For example, some approaches employ mechanisms that reduce an amount of electrical current provided to the memory sub-system for a particular period of time following initiation of a thermal throttling operation during which the temperature of the memory sub-system can be reduced. Although such approaches can allow for the temperature of the memory sub-system to brought within an acceptable operating range, during the period of time in which the reduced electrical current is provided to the memory sub-system, the memory sub-system can suffer from reduced performance. This reduction in performance can be undesirable, especially in critical applications and/or in applications in demanding applications in which very high memory sub-system performance is expected.

Aspects of the present disclosure address the above and other deficiencies by analyzing various data reliability parameters associated with the memory sub-system prior to performing thermal throttling operations for the memory sub-system. For example, in some embodiments, if the temperature of the memory sub-system (or of components of the memory sub-system) reach or exceed a threshold operating temperature, various data reliability parameters associated with the memory sub-system or components of the memory sub-system can be analyzed to determine if a thermal throttling operation should be performed.

One such data reliability parameter is a raw bit error rate (RBER) associated with the memory sub-system or components of the memory sub-system. For example, because the RBER can be indicative of performance and/or a health of the memory sub-system, if the RBER of the memory sub-system or components of the memory sub-system is determined to be within an acceptable range, it can be possible to delay or avoid performance of thermal throttling operations for the memory sub-system or components of the memory sub-system. By delaying or avoiding performance of thermal throttling operations based on data reliability parameters, memory sub-system performance can be improved in comparison to approaches in which thermal throttling operations are invoked solely based on the temperature of the memory sub-system and/or the components of the memory sub-system.

Figure 1:
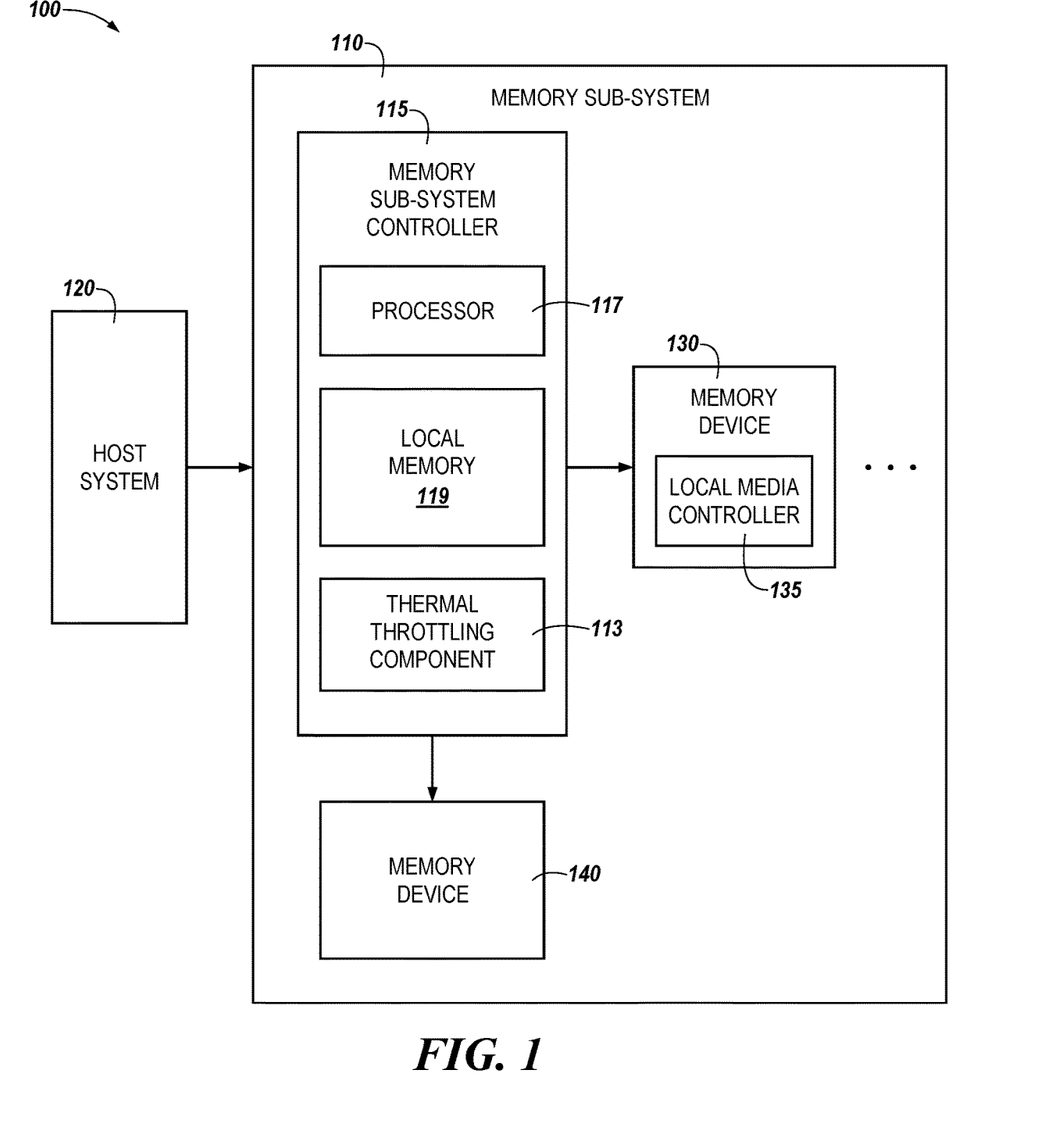
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative- and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative- or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a thermal throttling component 113. Although not shown in FIG. 1 so as to not obfuscate the drawings, the thermal throttling component 113 can include various circuitry to facilitate monitoring temperature characteristics for a memory sub-system and/or components of the memory sub-system, determining whether to perform thermal throttling operations for the memory sub-system and/or components of the memory sub-system based on data reliability parameters of the memory sub-system and/or components of the memory sub-system, and/or controlling performance of thermal throttling operations for the memory sub-system and/or the components of the memory sub-system. In some embodiments, the thermal throttling component 113 can include special purpose circuitry in the form of an ASIC, FPGA, state machine, and/or other logic circuitry that can allow the thermal throttling component 113 to orchestrate and/or perform operations to selectively perform thermal throttling operations for the memory device 130 and/or the memory device 140 based on determined operating temperatures and data reliability parameters.

In some embodiments, the memory sub-system controller 115 includes at least a portion of the thermal throttling component 113. For example, the memory sub-system controller 115 can include a processor 117 (processing device) configured to execute instructions stored in local memory 119 for performing the operations described herein. In some embodiments, the thermal throttling component 113 is part of the host system 110, an application, or an operating system.

In a non-limiting example, an apparatus (e.g., the computing system 100) can include a memory sub-system thermal throttling component 113. The memory sub-system thermal throttling component 113 can be resident on the memory sub-system 110. As used herein, the term "resident on" refers to something that is physically located on a particular component. For example, the memory sub-system thermal throttling component 113 being "resident on" the memory sub-system 110 refers to a condition in which the hardware circuitry that comprises the memory sub-system thermal throttling component 113 is physically located on the memory sub-system 110. The term "resident on" may be used interchangeably with other terms such as "deployed on" or "located on," herein The memory sub-system thermal throttling component 113 can be configured to monitor temperature characteristics for memory components of the memory sub-system and determine that a temperature characteristic corresponding to at least one of the memory components has reached a threshold temperature. As described above, the memory components can be memory dice or memory packages that form at least a portion of the memory device 130.

The memory sub-system thermal throttling component 113 that can be further configured to determine a raw bit error rate (RBER) for the at least one of the memory components that has reached the threshold temperature and determine whether the RBER is below a threshold RBER value for the at least one of the memory components that has reached the threshold temperature. In some embodiments, the memory sub-system thermal throttling component 113 can determine the threshold RBER value by retrieving threshold RBER values corresponding to the at least one of the memory components that has reached the threshold temperature from a read-only memory location, such as the local memory 119, associated with the memory sub-system 110 and/or comparing the retrieved RBER values to the determined RBER for the at least one of the memory components that has reached the threshold temperature.

In some embodiments, the retrieved threshold RBER values are determined, at least in part, on a relationship between an operating temperature and a cycling endurance parameter for the at least one of the memory components that has reached the threshold temperature. As used herein, a "cycling endurance parameter" generally refers to a quantity of program/erase cycles at which a memory component is subject to for a given period of time. In general, as the cycling endurance parameter increases, the acceptable operating temperature range and RBER also increase.

In some embodiments, the memory sub-system thermal throttling component 113 that can be further configured to cause, based on determining that the RBER for the at least one of the memory components that has reached the threshold temperature is below the threshold RBER value, a thermal throttling operation may not be performed. The memory sub-system thermal throttling component 113 can, in some embodiments, be configured to cause the threshold temperature to be altered such that the threshold temperature is increased. By refraining to perform the thermal throttling operation based on the data reliability parameters, the memory sub-system can continue to operate in the absence of performance limitations that can be present during a thermal throttling operation.

The memory sub-system thermal throttling component 113 can be configured to cause performance of a thermal throttling operation for the memory sub-system in response to determining that the RBER for the at least one of the memory components that has reached the threshold temperature is above the threshold RBER value. By performing a thermal throttling operation in response to a determination that the RBER for the memory component has reached or exceeded the threshold RBER value, the memory sub-system can be protected from adverse effect that can be introduced as a result of excessive temperature.

In another non-limiting example, a system (e.g., the computing system 100) can include a memory sub-system 110 comprising memory components arranged to form a stackable cross-gridded array of memory cells. A processing device (e.g., the processor 117 and/or the local media controller 135) can be coupled to the memory components and can perform operations comprising monitoring temperature characteristics for the memory components and determining that a temperature characteristic corresponding to at least one of the memory components has reached a threshold temperature. The processing device can be further configured to perform operations comprising determining a raw bit error rate (RBER) for the at least one of the memory components that has reached the threshold temperature, determining whether the determined RBER is below a threshold RBER value for the at least one of the memory components that has reached the threshold temperature, and, based on determining that the RBER for the at least one of the memory components that has reached the threshold temperature is below the threshold RBER value, refraining from performing a thermal throttling operation.

This can allow for thermal throttling operations for the memory sub-system 110 to be delayed or avoided, thereby maintaining high performance of the memory sub-system 110 so long as the memory sub-system 110 is not exposed to risks associated with experiencing temperatures that are outside an operating range of the memory sub-system 110. However, in some embodiments, the processing device can be configured to perform operations comprising causing performance of a thermal throttling operation for the memory sub-system 110 in response to determining that the RBER for the at least one of the memory components that has reached the threshold temperature is above the threshold RBER value.

In some embodiments, the processing device can be configured to perform operations comprising determining the threshold RBER value by retrieving threshold RBER values corresponding to the at least one of the memory components that has reached the threshold temperature from a read-only memory location (e.g., the local memory 119) associated with the memory sub-system 110. The retrieved threshold RBER values can be determined, at least in part, on a relationship between an operating temperature and a cycling endurance parameter for the at least one of the memory components that has reached the threshold temperature.

Figure 2:
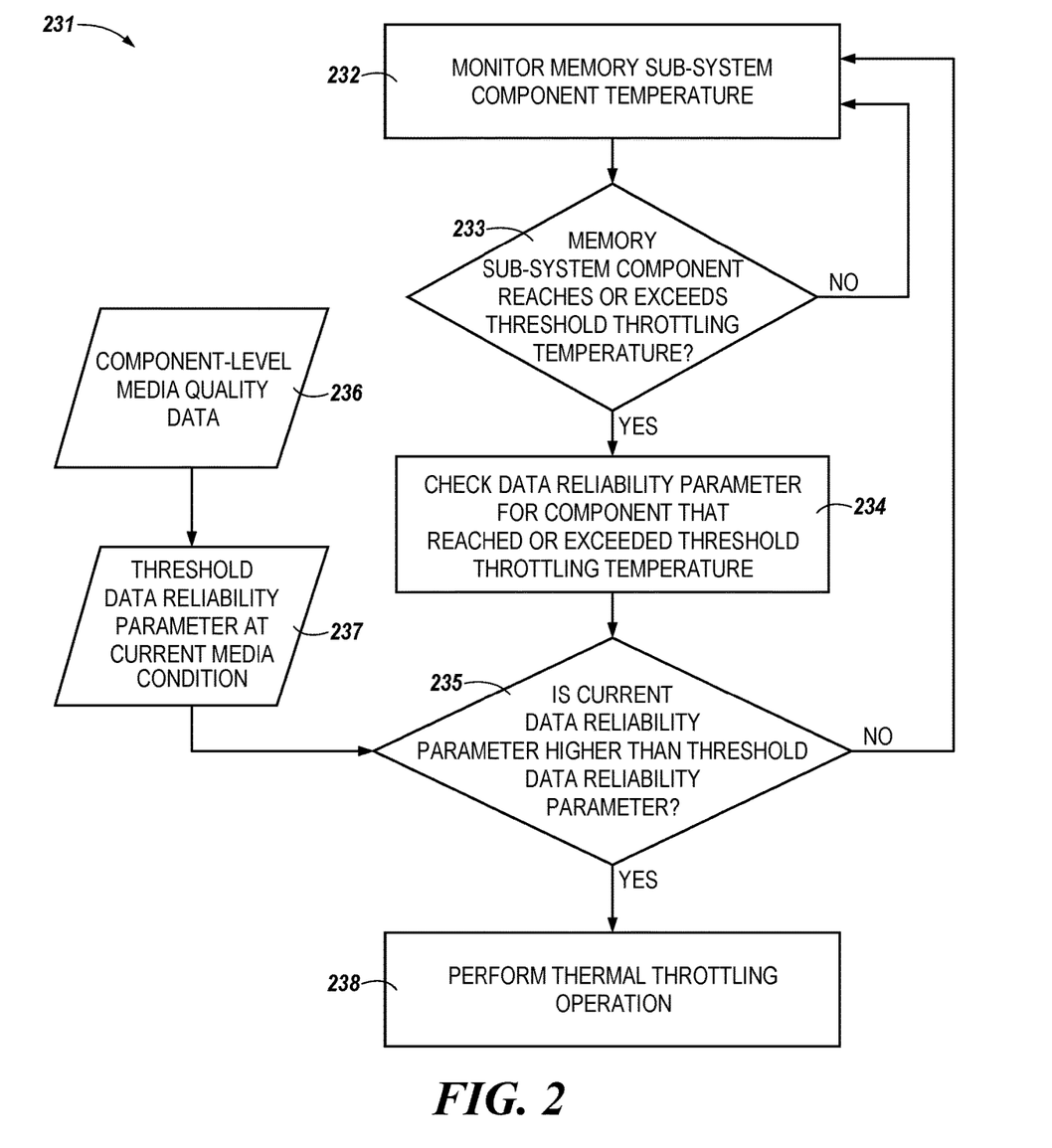
FIG. 2 is a flow diagram corresponding to memory sub-system temperature throttling relaxation in accordance with some embodiments of the present disclosure.

FIG. 2 is a flow diagram 231 corresponding to memory sub-system temperature control in accordance with some embodiments of the present disclosure. At block 232, temperatures of memory sub-system components can be monitored to determine if the operating temperature of the memory sub-system is within an acceptable operating range. In some embodiments, the temperatures can be monitored by a memory sub-system thermal throttling component, such as the thermal throttling component 113 illustrated in FIG. 1.

At block 233, a determination can be made as whether the memory sub-system component has reached or exceeded a threshold thermal throttling temperature. The threshold thermal throttling temperate can be a temperature at which a memory sub-system can initiate a thermal throttling operate to cause the temperature of the memory sub-system or its constituent components to be reduced. If the memory sub-system component has not reached or exceeded the threshold thermal throttling temperature, the flow 231 can return to block 232 and the temperature of the memory sub-system component can continue to be monitored.

If, however, it is determined that the memory sub-system component has reached or exceed the threshold thermal throttling temperature, at block 234, a data reliability parameter for the memory sub-system component that has reached or exceed the threshold thermal throttling temperature can be checked. In some embodiments, the data reliability parameter can be a raw bit error rate (RBER) or some other indication of the quality of data writes and/or retention by the memory sub-system and/or constituent memory components thereof.

At block 235, a determination can be made as to whether the current data reliability parameter is higher than a threshold data reliability parameter. As shown in FIG. 2, the current data reliability parameter can be based on component-level media quality data (shown at block 236) and/or a threshold data reliability parameter at the current media condition (shown at block 237). In some embodiments, the component-level media quality data can include information corresponding to RBER characteristics for the memory sub-system component as a function of memory cycle frequency and temperature, while the current media condition can include information corresponding to the current (e.g., measured or determined) RBER for the memory sub-system component. In some embodiments, the component-level media quality data can be stored in a read-only memory location (e.g., a fuse ROM) associated with the memory sub-system. As described above, the current media condition can be compared to the component-level media quality data to determine if the data reliability parameter determined at block 234 is higher or lower than the threshold data reliability parameter.

If the current data reliability parameter is not higher than the threshold data reliability parameter, the flow 231 can return to block 232 and the temperature of the memory sub-system component can continue to be monitored. However, if the current data reliability parameter is higher than the threshold data reliability parameter, at block 238 a thermal throttling operation can be performed for the memory sub-system.

Figure 3:
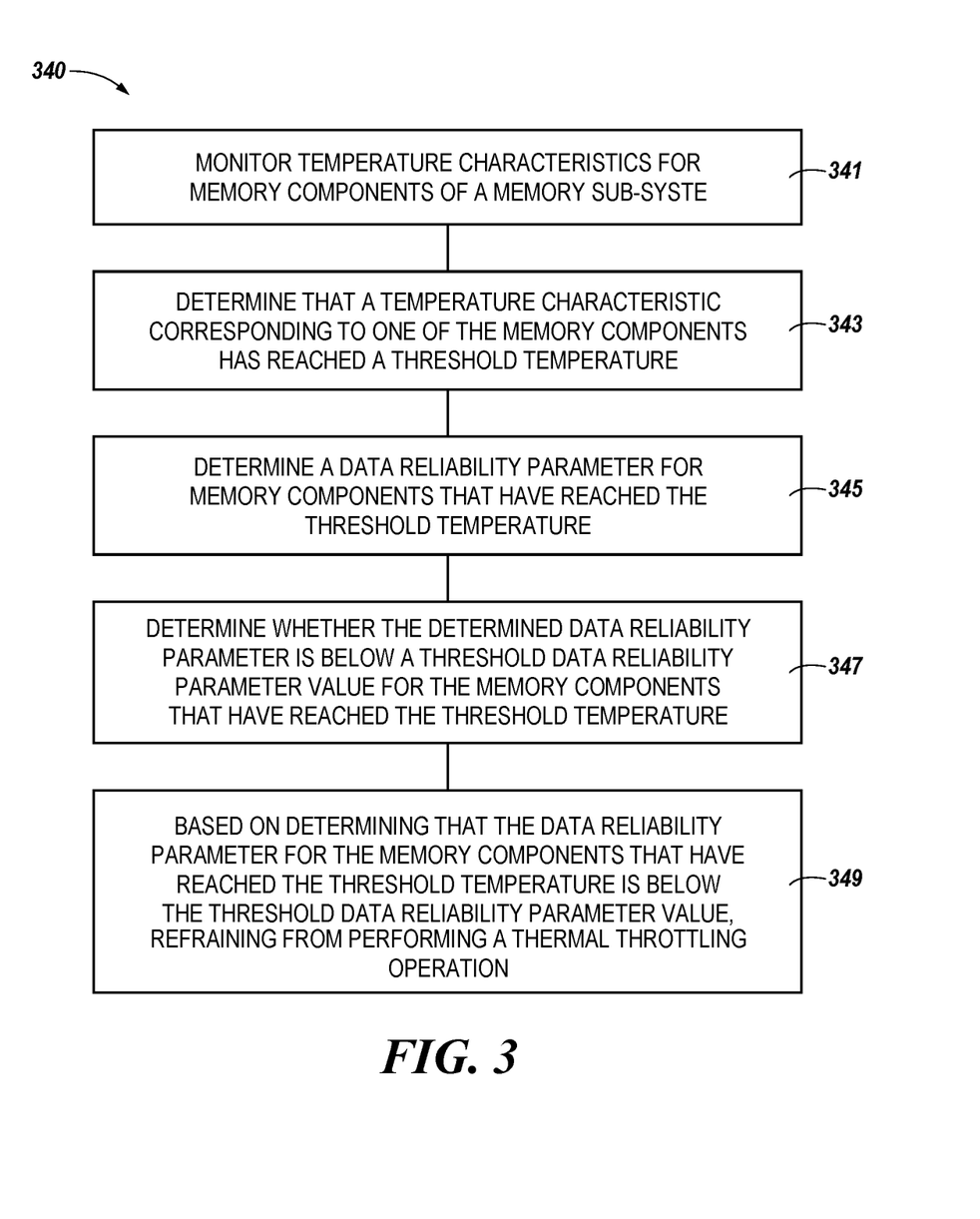
FIG. 3 is a flow diagram corresponding to a method for memory sub-system temperature throttling relaxation in accordance with some embodiments of the present disclosure.

FIG. 3 is flow diagram corresponding to a method 340 for memory dice arrangement in accordance with some embodiments of the present disclosure. The method 340 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 340 is performed by the thermal throttling component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 341, the method 340 can include monitoring temperature characteristics for memory components of a memory sub-system. In some embodiments, the memory sub-system can be analogous to the memory sub-system 110 illustrated in FIG. 1. As described above, the memory components can be memory dice or memory packages that are coupled to one another to create an array of memory cells, such as a three-dimensional stackable cross-gridded array of memory cells used by the memory sub-system to store data.

At block 343, the method 340 can include determining that a temperature characteristic corresponding to at least one of the memory components has reached a threshold temperature. In some approaches, this determination could lead to performance of a thermal throttling operation. In contrast, embodiments herein allow for the thermal throttling operation to be delayed or avoided if, for example, a data reliability parameter associated with the memory component(s) is below a threshold data reliability value, as described below.

At block 345, the method 340 can include determining a data reliability parameter for the memory components that have reached the threshold temperature. As described above, in some embodiments, the data reliability parameter can be a raw bit error rate (RBER) associated with the memory components that have reached the threshold temperature. Embodiments are not so limited, however, and in some embodiments the data reliability parameter can be a predetermined relationship between an operating temperature and a cycling endurance parameter for the memory components that have reached the threshold temperature.

At block 347, the method 340 can include determining whether the determined data reliability parameter is below a threshold data reliability parameter value for the memory components that have reached the threshold temperature. In some embodiments, the method 340 can include determining whether the determined data reliability parameter is below the threshold data reliability parameter value by comparing the determined data reliability parameter to a stored data reliability parameter for the memory components that have reached the threshold temperature.

At block 349, the method 340 can include refraining from performing a thermal throttling operation based on determining that the data reliability parameter for the memory components that have reached the threshold temperature is below the threshold data reliability parameter value. By relaxing the conditions under which a thermal throttling operation is performed, memory sub-system performance can be improved in comparison to approaches in which thermal throttling is performed without regard to data reliability parameters. In some embodiments, the method 340 can include increasing the threshold temperature.

In some embodiments, the method 340 can include performing a thermal throttling operation for the memory sub-system in response to determining that the data reliability parameter for the memory components that have reached the threshold temperature is above the threshold data reliability parameter value.

Figure 4:
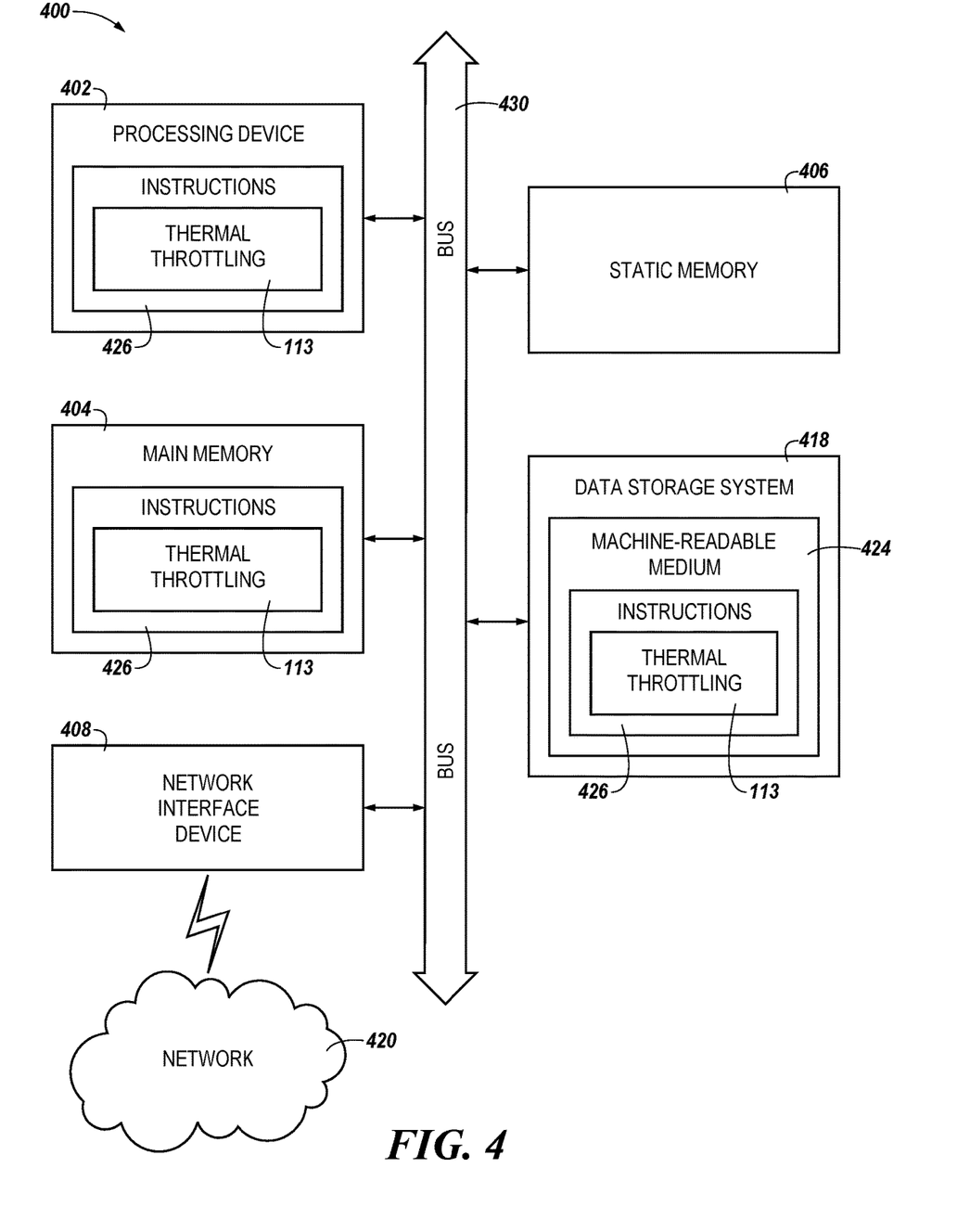
FIG. 4 is a block diagram of an example computer system in which embodiments of the present disclosure may operate.

FIG. 4 is a block diagram of an example computer system 400 in which embodiments of the present disclosure may operate. For example, FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the thermal throttling component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

The processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to a thermal throttling component (e.g., the thermal throttling component 113 of FIG. 1). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
monitoring temperature characteristics for a plurality of negative-and (NAND) memory components of a memory sub-system;
determining that a temperature characteristic corresponding to at least one of the memory components has reached a threshold temperature;
determining a data reliability parameter for the at least one of the memory components that has reached the threshold temperature;
determining whether the determined data reliability parameter is below a threshold data reliability parameter value for the at least one of the memory components that has reached the threshold temperature; and
based on determining that the data reliability parameter for the at least one of the memory components that has reached the threshold temperature is below the threshold data reliability parameter value, refraining from performing a thermal throttling operation.

2. The method of claim 1, further comprising performing a thermal throttling operation for the memory sub-system in response to determining that the data reliability parameter for the at least one of the memory components that has reached the threshold temperature is above the threshold data reliability parameter value.

3. The method of claim 1, wherein determining whether the determined data reliability parameter is below the threshold data reliability parameter value comprises comparing the determined data reliability parameter to a stored data reliability parameter for the at least one of the memory components that has reached the threshold temperature.

4. The method of claim 1, wherein the data reliability parameter comprises a raw bit error rate.

5. The method of claim 1, wherein the memory sub-system includes a stackable cross-gridded array of memory cells.

6. The method of claim 1, wherein the data reliability parameter comprises a predetermined relationship between an operating temperature and a cycling endurance parameter for the at least one of the memory components that has reached the threshold temperature.

7. An apparatus, comprising:
a memory sub-system thermal throttling component configured to:
monitor temperature characteristics for a plurality of negative-and (NAND) memory components of the memory sub-system;
determine that a temperature characteristic corresponding to at least one of the memory components has reached a threshold temperature;
determine a raw bit error rate (RBER) for the at least one of the memory components that has reached the threshold temperature;
determine whether the RBER is below a threshold RBER value for the at least one of the memory components that has reached the threshold temperature; and
based on determining that the RBER for the at least one of the memory components that has reached the threshold temperature is below the threshold RBER value, refrain from performing a thermal throttling operation.

8. The apparatus of claim 7, wherein the thermal throttling component is further configured to cause performance of a thermal throttling operation for the memory sub-system in response to determining that the RBER for the at least one of the memory components that has reached the threshold temperature is above the threshold RBER value.

9. The apparatus of claim 7, wherein the memory components comprise memory dice.

10. The apparatus of claim 7, wherein the thermal throttling component is resident on the memory sub-system.

11. The apparatus of claim 7, wherein the thermal throttling component is configured to determine the threshold RBER value by:
retrieving threshold RBER values corresponding to the at least one of the memory components that has reached the threshold temperature from a read-only memory location associated with the memory sub-system; and
comparing the retrieved RBER values to the determined RBER for the at least one of the memory components that has reached the threshold temperature.

12. The apparatus of claim 11, wherein the retrieved threshold RBER values are determined, at least in part, on a relationship between an operating temperature and a cycling endurance parameter for the at least one of the memory components that has reached the threshold temperature.

13. The apparatus of claim 7, wherein the memory sub-system includes a stackable cross-gridded array of memory cells.

14. A system, comprising:
a memory sub-system comprising a plurality of negative-and (NAND) memory components; and
a processing device coupled to the plurality of memory components, the processing device to perform operations comprising:
monitoring temperature characteristics for the plurality of memory components;
determining that a temperature characteristic corresponding to at least one of the memory components has reached a threshold temperature;
determining a raw bit error rate (RBER) for the at least one of the memory components that has reached the threshold temperature;
determining whether the determined RBER is below a threshold RBER value for the at least one of the memory components that has reached the threshold temperature; and
based on determining that the RBER for the at least one of the memory components that has reached the threshold temperature is below the threshold RBER value, refraining from performing a thermal throttling operation.

15. The system of claim 14, wherein the processing device is to perform operations comprising causing performance of a thermal throttling operation for the memory sub-system in response to determining that the RBER for the at least one of the memory components that has reached the threshold temperature is above the threshold RBER value.

16. The system of claim 14, wherein the memory components are arranged to form a stackable cross-gridded array of memory cells.

17. The system of claim 14, wherein the processing device is to perform operations comprising determining the threshold RBER value by retrieving threshold RBER values corresponding to the at least one of the memory components that has reached the threshold temperature from a read-only memory location associated with the memory sub-system.

18. The system of claim 17, wherein the retrieved threshold RBER values are determined, at least in part, on a relationship between an operating temperature and a cycling endurance parameter for the at least one of the memory components that has reached the threshold temperature.

19. The system of claim 14, wherein the processing device is to perform operations comprising altering the threshold temperature while refraining from performing a thermal throttling operation for the memory sub-system.

20. The system of claim 14, wherein the memory components comprise memory dice.

* * * * *